United States Patent
Kumar (10) Patent No.: US 11,461,188 B2
(45) Date of Patent: Oct. 4, 2022

(54) AUTOMATED FAILOVER BACKUP RECONFIGURATION MANAGEMENT FOR STORAGE SYSTEMS

(71) Applicant: EMC IP Holding Company LLC, Hopkinton, MA (US)

(72) Inventor: Sunil Kumar, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/155,277

(22) Filed: Jan. 22, 2021

(65) Prior Publication Data

US 2022/0237086 A1    Jul. 28, 2022

(51) Int. Cl.
*G06F 11/14* (2006.01)
*G06F 11/07* (2006.01)
*G06F 11/20* (2006.01)

(52) U.S. Cl.
CPC ...... *G06F 11/1464* (2013.01); *G06F 11/0772* (2013.01); *G06F 11/1451* (2013.01); *G06F 11/1469* (2013.01); *G06F 11/2023* (2013.01)

(58) Field of Classification Search
CPC ............. G06F 11/1464; G06F 11/1451; G06F 11/1469; G06F 11/2023
USPC ....................................................... 711/162
See application file for complete search history.

(56) References Cited

U.S. PATENT DOCUMENTS

| 2015/0261614 A1* | 9/2015 | Cape ................. G06F 8/443 |
| | | 717/148 |
| 2018/0349238 A1* | 12/2018 | Boshev .............. H04L 67/322 |
| 2019/0102260 A1* | 4/2019 | Yang ................. G06F 9/485 |
| 2019/0163584 A1* | 5/2019 | K ...................... G06F 11/2048 |
| 2019/0188080 A1* | 6/2019 | Cape ................. G06F 11/3409 |
| 2021/0157694 A1* | 5/2021 | Dye .................. G06F 11/3006 |
| 2022/0004468 A1* | 1/2022 | Willhalm ........... G06F 11/203 |

OTHER PUBLICATIONS

DELL EMC, "XtremIO v6.0 Specifications," Specification Sheet, 2017, 4 pages.
DELL EMC, "PowerMax OS," Dell EMC PowerMax Family Product Guide, May 2019, 192 pages.

(Continued)

*Primary Examiner* — Than Nguyen
(74) *Attorney, Agent, or Firm* — Ryan, Mason & Lewis, LLP (57) ABSTRACT

Techniques for managing backup plans in information processing systems are disclosed. For example, a method comprises managing a data backup plan for an information processing system comprising a set of host devices that execute application instances for which data is stored on a first storage system and mirrored on a second storage system. After a given condition is detected, managing the data backup plan comprises reconfiguring the data backup plan by: (i) automatically subscribing, to the data backup plan, one or more of the application instances that execute on one or more active ones of the set of host devices configured to store data on the second storage system; and (ii) automatically unsubscribing, from the data backup plan, one or more of the application instances that previously executed on one or more non-active ones of the set of host devices configured to store data on the first storage system.

20 Claims, 5 Drawing Sheets

(56) References Cited

OTHER PUBLICATIONS

DELL EMC, "Dell EMC Unity: Virtualization Integration," Technical White Paper, Oct. 2019, 39 pages.
DELL EMC, "Dell EMC PowerMax: iSCSI Implementation for Dell EMC Storage Arrays Running PowerMaxOS," Technical White Paper, Sep. 2019, 35 pages.
DELL EMC, "Introduction to Dell EMC XtremIO X2 Storage Array—A Detailed Review," Dell EMC White Paper, Apr. 2018, 52 pages.
DELL Technologies, "Dell EMC CloudIQ: A Detailed Review," Technical White Paper, Nov. 2020, 106 pages.
DELL Technologies, "Dell EMC PowerProtect Data Manager," Data Sheet, 2020, 2 pages.
DELL Technologies, "AppSync," Data Sheet, 2020, 3 pages.
Wikipedia, "Shadow Copy," https://en.wikipedia.org/w/index.php?title=Shadow_Copy&oldid=963779091, Jun. 21, 2020, 7 pages.
Microsoft Docs, "Volume Shadow Copy Service," https://docs.microsoft.com/en-us/windows-server/storage/file-server/volumeshadow-copy-service#how-volume-shadow-copy-service-works, Jan. 30, 2019, 23 pages.
Microsoft, "Volume Shadow Copy Service," Accessed Oct. 16, 2020, 351 pages.
NVM Express, "NVM Express, Revision 1.3," NVM Express, May 1, 2017, 282 pages.
Vmware, Inc., "VMware vSphere Virtual Volumes," https://www.vmware.com/content/dam/digitalmarketing/vmware/en/pdf/solutionoverview/products/virtualvolumes/vmware_virtual_volumes_solutionsoverview.pdf, Sep. 2015, 2 pages.
Vmware, Inc., "VMware vSphere Virtual Volumes (vVols): Getting Started Guide," Hyperconverged Infrastructure Business Unit, Technical Documentation v 1.3, Sep. 2019, 40 pages.
DELL EMC, "DELL EMC SC Series Storage and Microsoft Multipath I/O," CML 1004, Jul. 2018, 36 pages.

* cited by examiner

AUTOMATED FAILOVER BACKUP RECONFIGURATION MANAGEMENT FOR STORAGE SYSTEMS

FIELD

The field relates generally to information processing systems, and more particularly to techniques for managing backup data for applications in such information processing systems.

BACKGROUND

Most enterprise backup software solutions have backup plans to generate application-consistent backup copies to meet protection service level agreements (SLAs). This backup software is typically provisioned in primary data centers with enterprise grade storage systems. When the backup plan executes, as part of application protection, the backup software generates a backup copy of the production volumes.

This process works well while the primary storage system is operational. In scenarios where a primary storage system and/or associated host devices that execute the applications suffer a failure or require any downtime due to maintenance, the primary storage system replication link is failed over to a disaster recovery (DR) storage system and application instances associated with the primary storage system are restarted from the DR storage system. In such a scenario, an application backup administrator (i.e., a person) needs to manually reconfigure the backup plan with the new application(s) which are started from a mirrored copy stored at the DR storage system to meet the protection SLA. Because of the required manual intervention, this existing reconfiguration approach introduces delay that may result in violations of the protection SLA.

SUMMARY

Illustrative embodiments provide automated techniques for managing backup plans in information processing systems.

For example, in an illustrative embodiment, a method comprises managing a data backup plan for an information processing system comprising a set of host devices that execute application instances for which data is stored on a first storage system and mirrored on a second storage system. After a given condition is detected, managing the data backup plan comprises reconfiguring the data backup plan by: (i) automatically subscribing, to the data backup plan, one or more of the application instances that execute on one or more active ones of the set of host devices configured to store data on the second storage system; and (ii) automatically unsubscribing, from the data backup plan, one or more of the application instances that previously executed on one or more non-active ones of the set of host devices configured to store data on the first storage system.

For example, in further illustrative embodiments, when the given condition that is detected is a failover-causing event, one or more of the application instances that execute on one or more non-failed ones of the set of host devices configured to store data on the second storage system are automatically subscribed to the data backup plan, while one or more of the application instances that execute on one or more failed ones of the set of host devices configured to store data on the first storage system are automatically unsubscribed from the data backup plan.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
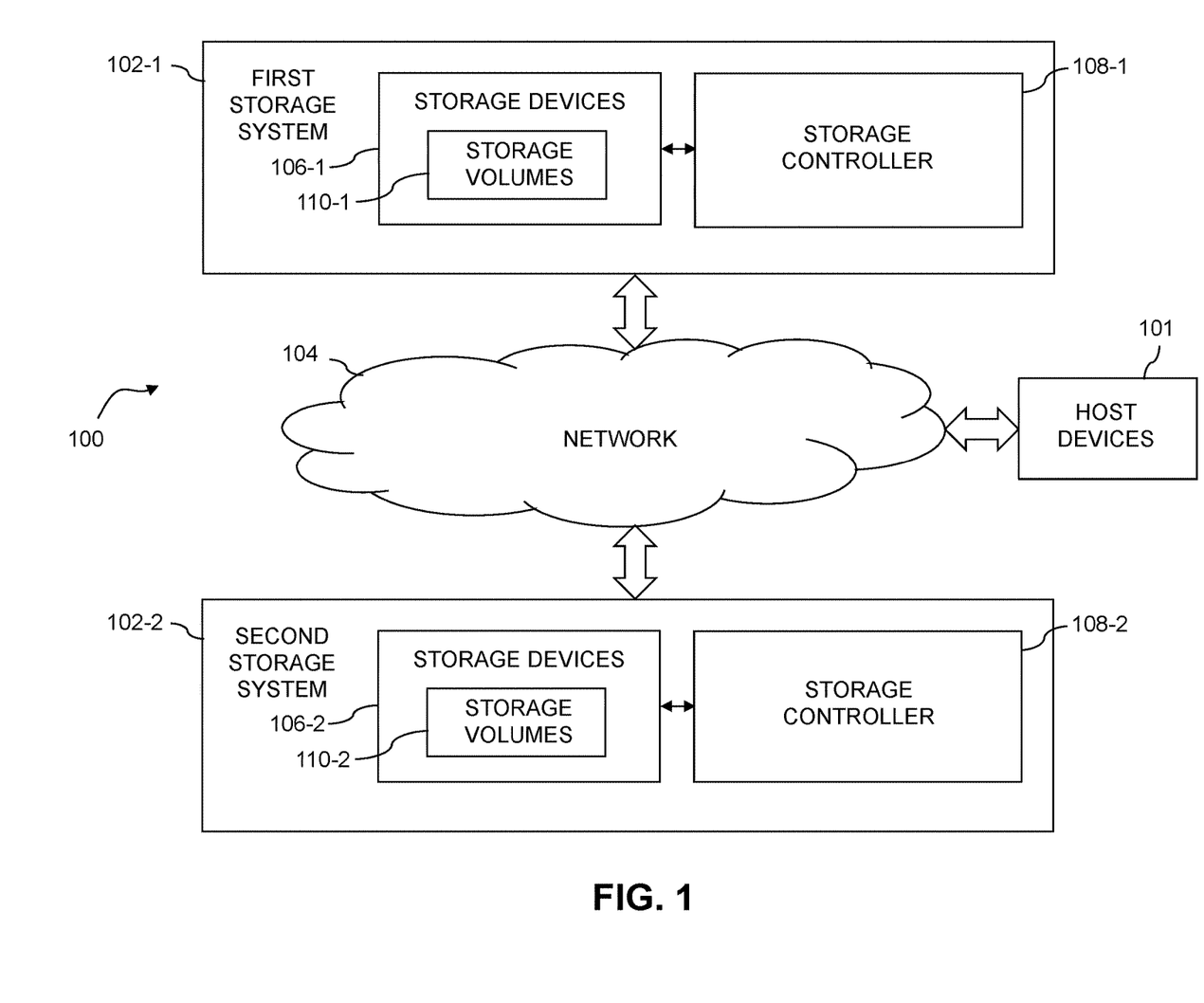
FIG. 1 illustrates an information processing system with which one or more illustrative embodiments can be implemented.

FIG. 1 shows an information processing system 100 with which one or more illustrative embodiments can be implemented. The information processing system 100 comprises a plurality of host devices 101, a first storage system 102-1 and a second storage system 102-2, all of which are configured to communicate with one another over a network 104. The first and second storage systems 102 are more particularly configured to participate in a data protection process in which data stored in the first storage system 102-1 is mirrored on the second storage system 102-2, possibly with involvement of at least one of the host devices 101. However, data mirroring can additionally or alternatively occur in the other direction, i.e., data stored in the second storage system 102-2 is mirrored on the first storage system 102-1.

Such a data protection process can involve replication wherein data written to one of the storage systems is copied to the other storage system. Furthermore, in addition to or alternative to the above-mentioned type of replication, point-in-time copies (snapshots) of the data in one of the storage systems can be made and stored on the other one of the storage systems. The phrase "data mirroring" and the like, as illustratively used herein, is intended to encompass one or more of the above-mentioned replication techniques and/or one or more other data backup techniques.

In any case, assume that the second storage system 102-2 acts as a backup or disaster recovery site for the first data storage system 102-1. Thus, if there is any failure or maintenance downtime (failover-causing event) associated with the first storage system 102-1 or associated ones of hosts devices 101 (failed or non-active), applications on non-failed (active) ones of the host devices 101, after restart, can use the data stored on the second storage system 102-2. In a disaster recovery scenario, the second storage system 102-2 may be located at a different site than the first storage system 102-1 such that the second storage system 102-2 presumably is not adversely impacted by whatever caused the first storage system 102-1 to fail (e.g., natural disaster, power failure, etc.). However, in other data protection scenarios, both of the storage systems 102 can be at the same site. Furthermore, in some embodiments, since the second storage system 102-2 mirrors the data at the first storage system 102-1, information processing system 100 may be considered to be a high availability (HA) system.

As shown, the storage systems 102 are operatively coupled to host devices 101 through network 104. The host devices 101 illustratively comprise servers or other types of computers of an enterprise computer system, cloud-based computer system or other arrangement of multiple compute nodes associated with respective users.

The host devices 101 in some embodiments illustratively provide compute services such as execution of one or more applications on behalf of each of one or more users associated with respective ones of the host devices. Such applications illustratively generate input-output (IO) operations that are processed by one or both (e.g., when replication is implemented) of the storage systems 102. The term "input-output" as used herein refers to at least one of input and output. For example, IO operations may comprise write requests and/or read requests directed to logical addresses of a particular logical storage volume of a given one of the storage systems 102. These and other types of IO operations are also generally referred to herein as IO requests.

The storage systems 102 illustratively comprise respective processing devices of one or more processing platforms. For example, the storage systems 102 can each comprise one or more processing devices each having a processor and a memory, possibly implementing virtual machines and/or containers, although numerous other configurations are possible.

The storage systems 102 can additionally or alternatively be part of cloud infrastructure such as an Amazon Web Services (AWS) system. Other examples of cloud-based systems that can be used to provide at least portions of the storage systems 102 include Google Cloud Platform (GCP) and Microsoft Azure.

The storage systems 102 may be implemented on a common processing platform, or on separate processing platforms.

The host devices 101 are illustratively configured to write data to and read data from the storage systems 102 in accordance with applications executing on those host devices for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The first storage system 102-1 comprises a plurality of storage devices 106-1 and an associated storage controller 108-1. The storage devices 106-1 store storage volumes 110-1. The storage volumes 110-1 illustratively comprise respective logical units (LUNs) or other types of logical storage volumes.

Similarly, the second storage system 102-2 comprises a plurality of storage devices 106-2 and an associated storage controller 108-2. The storage devices 106-2 store storage volumes 110-2, at least a portion of which represent respective LUNs or other types of logical storage volumes that are replicated or otherwise copied from the first storage system 102-1 to the second storage system 102-2.

The storage devices 106 of the storage systems 102 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of NVM devices may also be used. For example, hard disk drives (HDDs) can be used in combination with or in place of SSDs or other types of NVM devices.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices.

In some embodiments, at least one of the storage systems 102 illustratively comprises a scale-out all-flash content addressable storage array such as an XtremIO™ storage array from Dell Technologies. A wide variety of other types of storage arrays can be used in implementing a given one of the storage systems 102 in other embodiments, including by way of example one or more Unity™ or PowerMax™ storage arrays, commercially available from Dell Technologies. Additional or alternative types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

In some embodiments, communications between the host devices 101 and the storage systems 102 comprise Small Computer System Interface (SCSI) or Internet SCSI (iSCSI) commands. Other types of SCSI or non-SCSI commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other commands can be used in other embodiments.

For example, although in some embodiments certain commands used by the host devices 101 to communicate with the storage systems 102 illustratively comprise SCSI or iSCSI commands, other embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

It is to be understood that the data that is replicated or otherwise copied from the first storage system 102-1 to the second storage system 102-2 can include all of the data stored in the first storage system 102-1, or only certain designated subsets of the data stored in the first storage system 102-1, such as particular designated sets of LUNs or other logical storage volumes. Data protection processes of different types can be implemented for different parts of the stored data.

A given storage volume designated on the first storage system 102-1 for protection on the second storage system 102-2 illustratively comprises a set of one or more LUNs or other instances of the storage volumes 110-1 of the first storage system 102-1. Each such LUN or other storage volume on the first storage system 102-1 illustratively comprises at least a portion of a physical storage space of one or more of the storage devices 106-1. The corresponding mirrored LUN or other storage volume of the storage volumes 110-2 of the second storage system 102-2 illustratively comprises at least a portion of a physical storage space of one or more of the storage devices 106-2.

Thus, as mentioned above, in some embodiments, the first storage system 102-1 may be considered a primary (production) storage system and the second storage system 102-2 may be considered a disaster recovery (or backup) storage system. As mentioned above in the background section, backup applications typically have backup plans to generate application-consistent backup copies to meet protection service level agreements (SLAs). This backup application is typically provisioned in the primary storage system. When the backup plan executes, as part of application data protection, the backup application generates a backup copy of these production volumes. As previously explained, when the primary storage system such as storage system 102-1 or associated host devices 101 suffer a failure or require any downtime due to maintenance, there is a failover to a disaster recovery (DR) storage system such as storage system 102-2, and application instances running in association with the primary storage system are restarted from the DR storage system. In such a scenario, an application backup administrator (i.e., a person) needs to manually reconfigure the backup plan with the new application(s) which are started from the mirrored data copy at the DR storage system to meet the protection SLA. This requires manual intervention as well as introducing a possibility that the delay caused by the reconfiguration may result in violations of the protection SLA.

Figure 2:
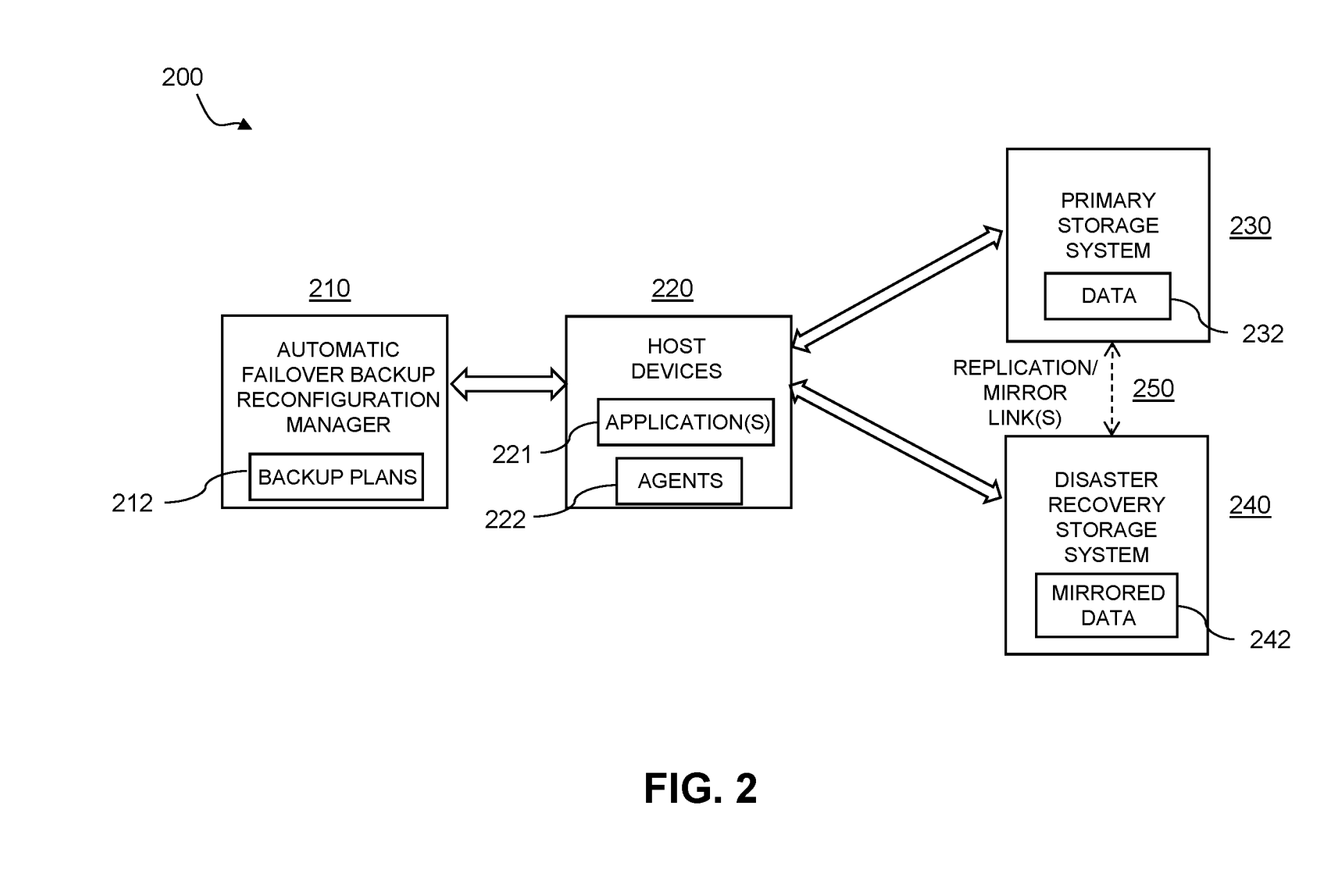
FIG. 2 illustrates an information processing system with automated failover backup reconfiguration management according to an illustrative embodiment.

Illustrative embodiments overcome the above and other drawbacks with existing disaster recovery backup plans by providing automatic failover backup reconfiguration management. FIG. 2 illustrates an information processing system 200 according an illustrative embodiment. As shown, information processing system 200 comprises an automatic failover backup reconfiguration manager 210, host devices 220, a primary storage system 230, and a disaster recovery (DR) storage system 240 operatively coupled as shown. It is to be appreciated that host devices 101 in FIG. 1 are examples of host devices 220, while the first storage system 102-1 in FIG. 1 is an example of primary storage system 230 and the second storage system 102-2 in FIG. 1 is an example of DR storage system 240. As will be further explained, automatic failover backup reconfiguration manager 210 comprises one or more backup plans 212, and one or more host devices 220 respectively comprise one or more applications (or application instances) 221 and at least some of the host devices 220 have application-aware agents 222 (as will be further explained below). By "application-aware," it is illustratively meant that agents 222 are configured to monitor and/or obtain (collect) information from applications 221 executing in the host devices 220 as part of the backup plans 212 of automatic failover backup reconfiguration manager 210. Also, automatic failover backup reconfiguration manager 210 is shown as separate from host devices 220, primary storage system 230, and disaster recovery (DR) storage system 240. It is to be appreciated, however, that some functionalities of automatic failover backup reconfiguration manager 210 may be implemented in whole or in part on one or more host devices 220, primary storage system 230, disaster recovery storage system 240 and/or in other components (not expressly shown) of information processing system 200.

Automatic failover backup reconfiguration manager 210 is configured to detect the failover scenario described above, as well as other functions, and automatically reconfigure one or more backup plans 212 to include (subscribe) application instances started on host devices 220 with mirrored data 242 (data that mirrors data 232 stored on primary storage system 230) stored on DR storage system 240 after a failover event.

In illustrative embodiments, solutions assume a backup plan is configured with an initial set of application(s) subscribed thereto and the underlying storage systems (e.g., part of primary storage system 230) are capable of mirroring primary volumes to another storage system (e.g., DR storage system 240) which can run the workload. Thus, as shown, primary storage system 230 and disaster recovery storage system 240 have one or more replication/mirror links 250 established. Note that one or more of replication/mirror links 250 do not necessarily have to be a direct physical link between the two storage systems 230 and 240, although one or more of them can be. Rather, depending on the type of data protection used to back up data 232 of primary storage system 230 as mirrored data 242 on disaster recovery storage system 240, one or more of replication/mirror links 250 can refer to functional links that are established between the two storage systems 230 and 240 (e.g., through operations in one or more of host devices 220).

It should be noted that while storage system 240 is designated for disaster recovery and storage system 230 is designated as primary, the roles of the two storage systems can be swapped. Thus, storage system 240 can take on the primary role while storage system 230 takes on the disaster recovery (secondary) role. Thus, depending on the designation, replication of data can occur in a storage system 230→storage system 240 direction, or a storage system 240→storage system 230 direction (i.e., wherein storage system 230 mirrors data from storage system 240).

More particularly, automatic failover backup reconfiguration manager 210 is configured to perform and/or cause performance of steps/operations shown in methodology 300 of FIG. 3, which will now be explained.

In step 302, when at least one of the backup plans 212 (referred to individually below as backup plan 212) initially executes, automatic failover backup reconfiguration manager 210 collects information from host devices 220, primary storage system 230 and disaster recovery storage system 240. More particularly, in one example, automatic failover backup reconfiguration manager 210 performs a deep-drilling type collection operation of underlying storage system information for applications 221. For example, the collection operation can include, but is not limited to, detecting all information related to replication/mirror links (e.g., replication/mirror links 250), along with the state of the replication/mirror links (e.g., active, failed, etc.), and the mirrored volumes (e.g., mirrored data 242) involved. As part of this step, a direction of replication data flow is also detected, e.g., which site is primary and which one is disaster recovery (i.e., secondary). Once this detailed drilling information is collected, it is persisted by automatic failover backup reconfiguration manager 210 (e.g., stored therein and/or stored in storage associated therewith) so that subsequent executions of the backup plan 212 can make use of this information to detect if a replication/failover has happened or not. In a normal execution of the backup plan 212, the secondary volumes (e.g., mirrored data 242) is not used, and the backup plan 212 can execute and trigger a backup of the active storage on the primary side (e.g., data 232).

In step 304, automatic failover backup reconfiguration manager 210 detects any change in replication link direction and/or failover status. More particularly, in a subsequent execution of the backup plan 212, automatic failover backup reconfiguration manager 210 checks if the subscribed application instance (one or more of applications 221) is alive (active or non-failed) or not before triggering the backup. For example, one or more of host devices 220 may have failed (and thus any application instances executing thereon become non-active or failed), while one or more other ones of the host devices 220 may still be active or non-failed. If automatic failover backup reconfiguration manager 210 finds any application instance as not responding, automatic failover backup reconfiguration manager 210 performs a lookup in the persistence (i.e., information collected and stored in step 302) and checks if the application instances were associated with a storage system which the replication session established with another system. If a replication link was found, automatic failover backup reconfiguration manager 210 queries the underlying storage system (either primary or secondary) to find out the active direction of the replication link and if a failover has been triggered as compared to the last execution of the backup plan 212. If a failover is detected, automatic failover backup reconfiguration manager 210 proceeds to the next step, otherwise it fails the backup of the application or can, for example, take a cold backup of the application by backing-up only application volumes.

In step 306, automatic failover backup reconfiguration manager 210 queries all host devices 220 attached to the mirrored volumes (e.g., mirrored data 242). More particularly, once a replication link is detected as failed over, automatic failover backup reconfiguration manager 210 performs a query on the failed over replication session and finds all the failed over volume information and the one or more host devices 220 masked to these volumes. These host devices are assumed to be the one or more host devices 220 where application instances are currently running.

In step 308, automatic failover backup reconfiguration manager 210 pushes application-aware host agents 222 to the one or more host devices 220 identified in step 306. More particularly, automatic failover backup reconfiguration manager 210 checks whether or not the one or more host devices 220 identified in step 306 are already configured as part of an inventory for the backup plan 212. Assuming not, automatic failover backup reconfiguration manager 210 pushes application-aware agents 222 on these one or more host devices 220. It is assumed that automatic failover backup reconfiguration manager 210 has the required credentials to push the application-aware agents 222 to the host devices 220, e.g., virtual machine (VM) administrator credentials or common backup credentials used for backup agents.

In step 310, automatic failover backup reconfiguration manager 210 performs application discovery on the one or more host devices 220 via the deployed application-aware agents 222. More particularly, after pushing the application-aware agents 222 on the one or more host devices 220, automatic failover backup reconfiguration manager 210 triggers a deep discovery of the application instances on these one or more host devices 220. In an illustrative embodiment, deep discovery involves finding all the application instances on the given host device, and performing a deep-drilling type collection operation of information from each application to the underlying storage volume mapping information. Other information can also be collected in this application discovery step.

In step 312, automatic failover backup reconfiguration manager 210 performs a reverse mapping on the information collected as part of the application discovery in step 310 and creates a co-relation between the existing primary application to the failed over instance of the primary application. In other words, after a failure or other cause for one or more host devices 220 to go offline, possibly along with the primary storage system 230, recall in step 306 that one or more other host devices 220 that are masked to the mirrored volumes in disaster recovery storage system 240 are identified and, in step 308, application-aware agents 222 are pushed thereto. Thus, as illustratively used here, the phrase "primary application" refers to an application instance that had previously been running on one of the failed host devices using data on the primary storage system 230, while the phrase "failed over instance of the primary application" refers to an application instance on one of the still active (non-failed) host devices that is masked to volumes on the disaster recovery storage system 240. In one exemplary embodiment, step 312 may involve the sub-steps below:

(i) Collect all remote volume information for the primary application instances.

(ii) Iterate through the list of applications along with the drilled down information collected as part of application discovery and match it with the remote volume information.

(iii) Once a match is found for the remote volume, create a relationship table between primary application and the application corresponding to the matching remote volume.

In step 314, once the primary application is mapped to the failed over application, automatic failover backup reconfiguration manager 210 initiates an automatic subscription (registration, attachment, association, or the like) of the failed over application to the backup plan 212 and unsubscribes the former primary application from the backup plan 212, and the backup plan execution continues. Advantageously, this guarantees that backup plans do not miss their protection cycles irrespective of replication link failover and, as such, the SLA is maintained without any manual intervention.

Figure 3:
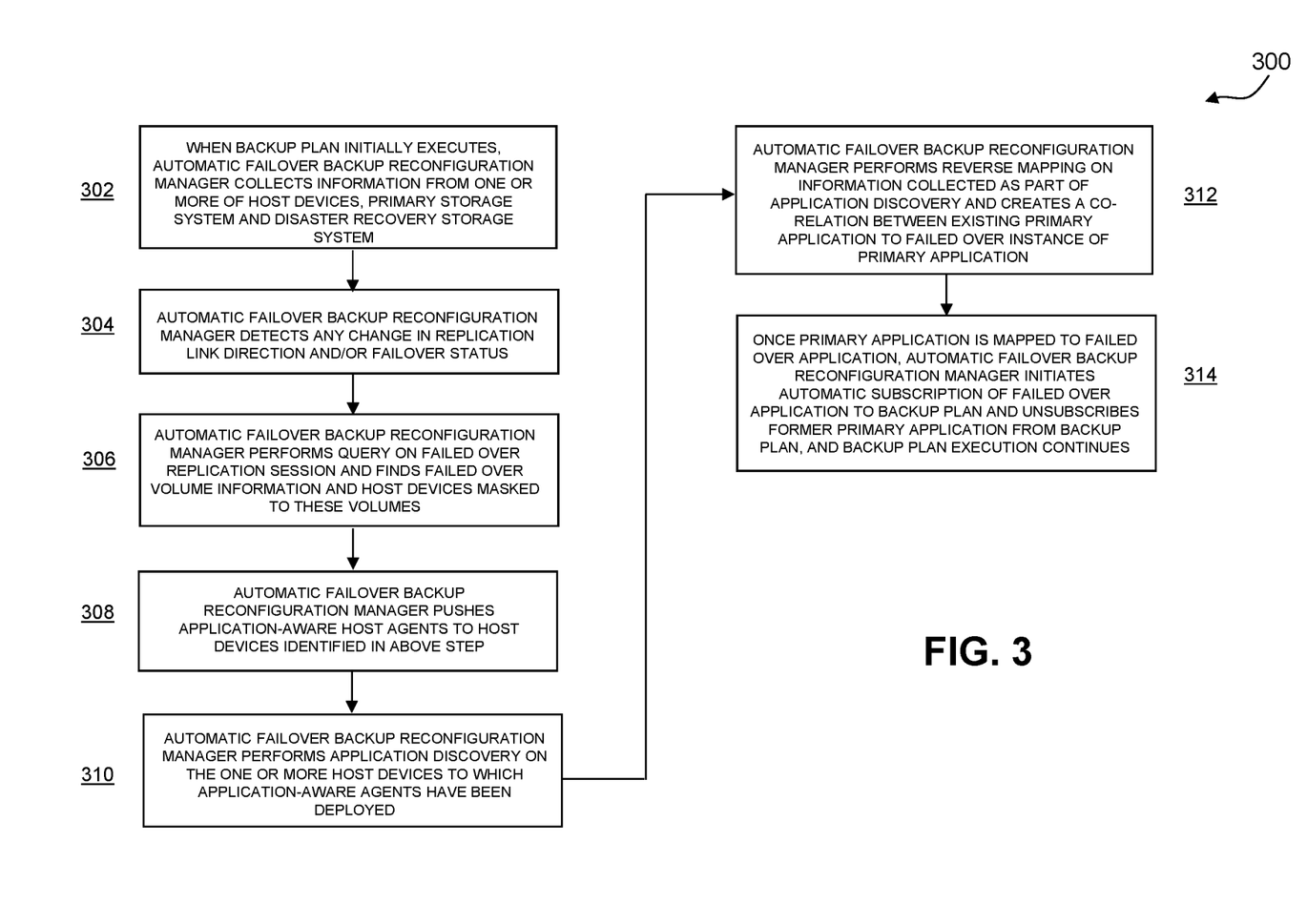
FIG. 3 illustrates a methodology for automated failover backup reconfiguration management according to an illustrative embodiment.

The particular processing operations and other system functionality described in conjunction with FIG. 1-3 are presented by way of illustrative example only, and should not be construed as limiting the scope of the disclosure in any way. Alternative embodiments can use other types of processing operations involving host devices, storage systems and snapshot creation functionality. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of synchronized snapshot arrangements within a given information processing system.

Functionality such as that described in conjunction with the methodology of FIG. 3 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system described herein may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system components described herein can be implemented for use by tenants of such a multi-tenant environment.

As mentioned previously, cloud infrastructure as disclosed herein can include cloud-based systems. Virtual machines provided in such systems can be used to implement illustrative embodiments. These and other cloud-based systems in illustrative embodiments can include object stores.

Illustrative embodiments of processing platforms will now be described in greater detail with reference to FIGS. 4 and 5.

Figure 4:
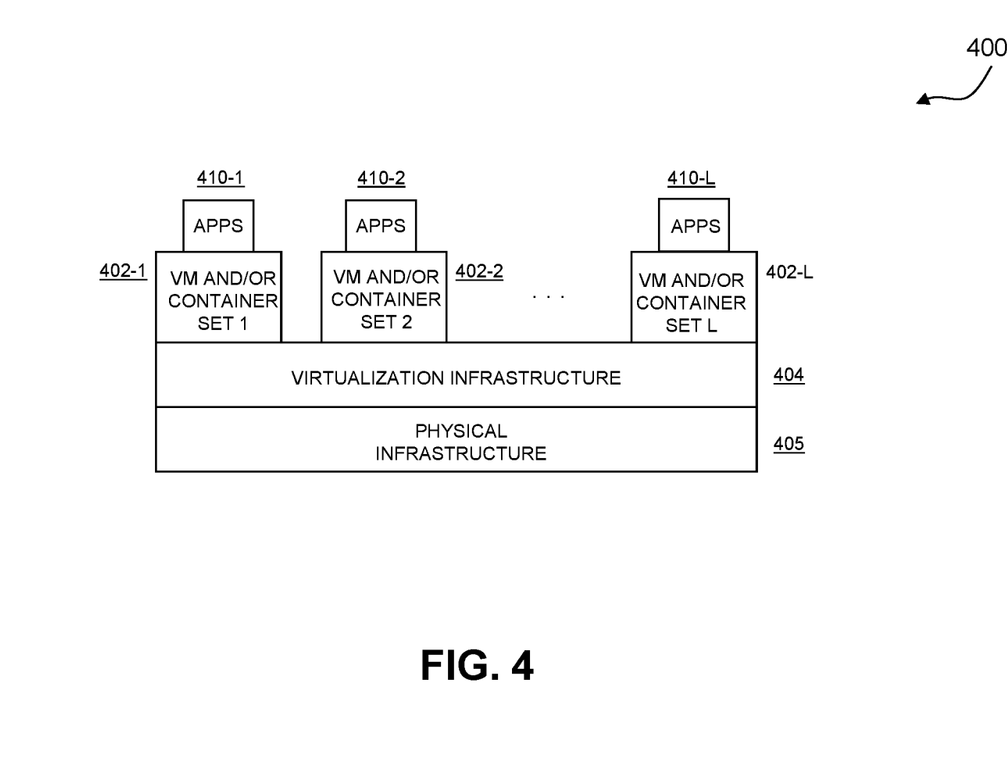
FIGS. 4 and 5 show examples of processing platforms that may be utilized to implement at least a portion of an information processing system with automated failover backup reconfiguration management according to illustrative embodiments.
Figure 5:
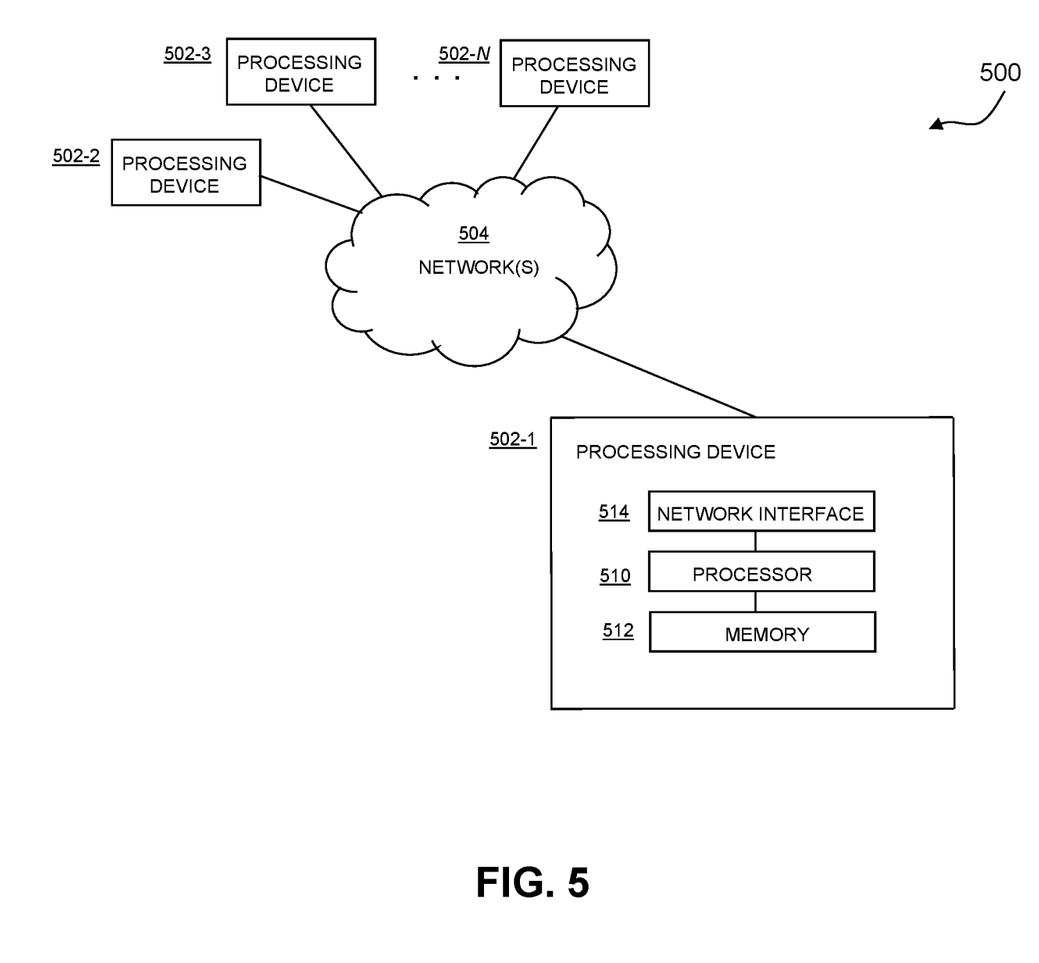

FIG. 4 shows an example processing platform comprising cloud infrastructure 400. The cloud infrastructure 400 comprises a combination of physical and virtual processing resources that may be utilized to implement at least a portion of the information processing systems described herein. The cloud infrastructure 400 comprises multiple virtual machines (VMs) and/or container sets 402-1, 402-2, . . . 402-L implemented using virtualization infrastructure 404. The virtualization infrastructure 404 runs on physical infrastructure 405, and illustratively comprises one or more hypervisors and/or operating system level virtualization infrastructure. The operating system level virtualization infrastructure illustratively comprises kernel control groups of a Linux operating system or other type of operating system.

The cloud infrastructure 400 further comprises sets of applications 410-1, 410-2, . . . 410-L running on respective ones of the VMs/container sets 402-1, 402-2, . . . 402-L under the control of the virtualization infrastructure 404. The VMs/container sets 402 may comprise respective VMs, respective sets of one or more containers, or respective sets of one or more containers running in VMs.

In some implementations of the FIG. 4 embodiment, the VMs/container sets 402 comprise respective VMs implemented using virtualization infrastructure 404 that comprises at least one hypervisor. A hypervisor platform may be used to implement a hypervisor within the virtualization infrastructure 404, where the hypervisor platform has an associated virtual infrastructure management system. The underlying physical machines may comprise one or more distributed processing platforms that include one or more storage systems.

In other implementations of the FIG. 4 embodiment, the VMs/container sets 402 comprise respective containers implemented using virtualization infrastructure 404 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of systems 100 and 300 may each run on a computer, server, storage device or other processing platform element. A given such element may be viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

The processing platform 500 in this embodiment comprises a portion of system 100 or 300 and includes a plurality of processing devices, denoted 502-1, 502-2, 502-3, . . . 502N, which communicate with one another over a network 504.

The network 504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 502-1 in the processing platform 500 comprises a processor 510 coupled to a memory 512. The processor 510 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 512 may comprise random access memory (RAM), read-only memory (ROM), flash memory or other types of memory, in any combination. The memory 512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and systems 100 and 200 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more components of the FIG. 1 system and the FIG. 2 system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

The invention claimed is:

1. An apparatus comprising:
   at least one processing device comprising a processor coupled to a memory, the at least one processing device, when executing program code, is configured to:
   manage a data backup plan for an information processing system comprising a set of host devices that execute application instances for which data is stored on a first storage system and mirrored on a second storage system;
   wherein, after a given condition is detected, managing a data backup plan comprises reconfiguring the data backup plan by: (i) automatically subscribing, to the data backup plan, one or more of the application instances that execute on one or more active ones of the set of host devices configured to store data on the second storage system; and (ii) automatically unsubscribing, from the data backup plan, one or more of the application instances that previously executed on one or more non-active ones of the set of host devices configured to store data on the first storage system;

wherein managing a data backup plan further comprises: executing the data backup plan to:

collect information from one or more of the set of host devices, the first storage system, and the second storage system; and detect occurrence of a failover-causing condition as the given condition and identifying application instances on one or more failed ones of the set of host devices;

identifying application instances on one or more non-failed ones of the set of host devices configured to store data on the second storage system; and generating a mapping between applications instances on the one or more non-failed ones of the set of host devices and applications instances on the one or more failed ones of the set of host devices.

2. The apparatus of claim 1, wherein when the given condition that is detected is a failover-causing event: (i) one or more of the application instances that execute on one or more non-failed ones of the set of host devices configured to store data on the second storage system are automatically subscribed to the data backup plan; and (ii) one or more of the application instances that execute on one or more failed ones of the set of host devices configured to store data on the first storage system are automatically unsubscribed from the data backup plan.

3. The apparatus of claim 1, wherein the collected information comprises information relating to one or more of: (i) a status of links between the first storage system and the second storage system; (ii) a direction of data mirroring between the first storage system and the second storage system; and (iii) one or more storage volumes that are mirrored.

4. The apparatus of claim 3, wherein detecting the occurrence of a failover-causing condition is performed subsequent to collecting information.

5. The apparatus of claim 4 wherein managing a data backup plan further comprises deploying an application-aware agent on each of the one or more non-failed ones of the set of host devices configured to store data on the second storage system.

6. The apparatus of claim 5, wherein managing a data backup plan further comprises collecting information via the deployed application-aware agent on applications instances on each of the one or more non-failed ones of the set of host devices.

7. The apparatus of claim 6, wherein the mapping is generated between applications instances on each of the one or more non-failed ones of the set of host devices and applications instances on each of the one or more failed ones of the set of host devices.

8. The apparatus of claim 7, wherein managing a data backup plan further comprises using the mapping to: (i) subscribe the applications instances on each of the one or more non-failed ones of the set of host devices to the data backup plan; and (ii) unsubscribe the applications instances on each of the one or more failed ones of the set of host devices from the data backup plan.

9. The apparatus of claim 1, wherein the first storage system comprises a production storage system and the second storage system comprises a disaster recovery storage system.

10. A method comprising:

managing a data backup plan for an information processing system comprising a set of host devices that execute application instances for which data is stored on a first storage system and mirrored on a second storage system;

wherein, after a given condition is detected, managing a data backup plan comprises reconfiguring the data backup plan by: (i) automatically subscribing, to the data backup plan, one or more of the application instances that execute on one or more active ones of the set of host devices configured to store data on the second storage system; and (ii) automatically unsubscribing, from the data backup plan, one or more of the application instances that previously executed on one or more non-active ones of the set of host devices configured to store data on the first storage system;

wherein managing a data backup plan further comprises: executing the data backup plan to:

collect information from one or more of the set of host devices, the first storage system, and the second storage system; and detect occurrence of a failover-causing condition as the given condition and identifying application instances on one or more failed ones of the set of host devices;

identifying application instances on one or more non-failed ones of the set of host devices configured to store data on the second storage system; and generating a mapping between applications instances on the one or more non-failed ones of the set of host devices and applications instances on the one or more failed ones of the set of host devices; and wherein the managing step is performed by at least one processing device comprising a processor coupled to a memory executing program code.

11. The method of claim 10, wherein when the given condition that is detected is a failover-causing event: (i) one or more of the application instances that execute on one or more non-failed ones of the set of host devices configured to store data on the second storage system are automatically subscribed to the data backup plan; and (ii) one or more of the application instances that execute on one or more failed ones of the set of host devices configured to store data on the first storage system are automatically unsubscribed from the data backup plan.

12. The method of claim 10, wherein the collected information comprises information relating to one or more of: (i) a status of links between the first storage system and the second storage system; (ii) a direction of data mirroring between the first storage system and the second storage system; and (iii) one or more storage volumes that are mirrored.

13. The method of claim 12, wherein managing a data backup plan comprises detecting the occurrence of a failover-causing condition subsequent to collecting the information.

14. The method of claim 13, wherein managing a data backup plan further comprises deploying an application-aware agent on each of the one or more non-failed ones of the set of host devices configured to store data on the second storage system.

15. The method of claim 14, wherein managing a data backup plan further comprises collecting information via the deployed application-aware agent on applications instances on each of the one or more non-failed ones of the set of host devices.

16. The method of claim 15, wherein the mapping is generated between applications instances on each of the one or more non-failed ones of the set of host devices and applications instances on each of the one or more failed ones of the set of host devices.

17. A computer program product comprising a non-transitory processor-readable storage medium having stored therein program code of one or more software programs, wherein the program code when executed by at least one processing device causes the at least one processing device to:

manage a data backup plan for an information processing system comprising a set of host devices that execute application instances for which data is stored on a first storage system and mirrored on a second storage system;

wherein, after a given condition is detected, managing a data backup plan comprises reconfiguring the data backup plan by: (i) automatically subscribing, to the data backup plan, one or more of the application instances that execute on one or more active ones of the set of host devices configured to store data on the second storage system; and (ii) automatically unsubscribing, from the data backup plan, one or more of the application instances that previously executed on one or more non-active ones of the set of host devices configured to store data on the first storage system;

wherein managing a data backup plan further comprises: executing the data backup plan to:
collect information from one or more of the set of host devices, the first storage system, and the second storage system; and detect occurrence of a failover-causing condition as the given condition and identifying application instances on one or more failed ones of the set of host devices;

identifying application instances on one or more non-failed ones of the set of host devices configured to store data on the second storage system; and generating a mapping between applications instances on the one or more non-failed ones of the set of host devices and applications instances on the one or more failed ones of the set of host devices.

18. The computer program product of claim 17, wherein when the given condition that is detected is a failover-causing event: (i) one or more of the application instances that execute on one or more non-failed ones of the set of host devices configured to store data on the second storage system are automatically subscribed to the data backup plan; and (ii) one or more of the application instances that execute on one or more failed ones of the set of host devices configured to store data on the first storage system are automatically unsubscribed from the data backup plan.

19. The computer program product of claim 17, wherein the collected information comprises information relating to one or more of: (i) a status of links between the first storage system and the second storage system; (ii) a direction of data mirroring between the first storage system and the second storage system; and (iii) one or more storage volumes that are mirrored.

20. The computer program product of claim 19, wherein managing a data backup plan further comprises:

deploying an application-aware agent on each of the one or more non-failed ones of the set of host devices configured to store data on the second storage system; and collecting information via the deployed application-aware agent on applications instances on each of the one or more non-failed ones of the set of host devices.

* * * * *